(12) United States Patent
Schutten et al.

(10) Patent No.: US 7,609,532 B1
(45) Date of Patent: Oct. 27, 2009

(54) PHASE-SHIFTED PWM BRIDGE WITH SWITCHABLE INDUCTORS TO MAINTAIN ZERO-VOLTAGE SWITCHING AT LIGHT LOAD

(75) Inventors: Michael Joseph Schutten, Rotterdam, NY (US); Robert Louis Steigerwald, Burnt Hills, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 63 days.

(21) Appl. No.: 12/021,793

(22) Filed: Jan. 29, 2008

(51) Int. Cl.
*H02M 3/335* (2006.01)
*H02M 3/24* (2006.01)
*H02M 7/5387* (2006.01)

(52) U.S. Cl. .............................. 363/17; 363/98; 363/132
(58) Field of Classification Search .................. 363/17, 363/98, 132
See application file for complete search history.

(56) References Cited

U.S. PATENT DOCUMENTS 4,864,479 A    9/1989 Steigerwald et al.

5,946,200 A * 8/1999 Kim et al. ..................... 363/17

OTHER PUBLICATIONS

MWeene, "a 1kW 500 kHz Front-End Converter for a Distributed Power Supply System", IEEE Transactions on Power Electroncis, vol. 6, No. 3, Jul. 1991.
U.S. Appl. No. 11/965,327 entitled "Phase-Shifted Ridge With Auxiliary Circuit to Maintain Zero-Voltage-Switching," filed on Dec. 27, 2007 in the names of Michael J. Schutten and Robert L. Steigerwald, inventors.

* cited by examiner

*Primary Examiner*—Shawn Riley
(74) *Attorney, Agent, or Firm*—Duane Morris LLP

(57) ABSTRACT

A dc-to-dc pulse-width-modulated phase-shifted full bridge defines two taps, and the bridge switches are operated to produce alternating voltage between the taps. A switchable inductor is connected between each tap and a reference potential. The inductors are switched into circuit during low-load conditions to provide additional energy storage for zero-volt switching (ZVS) of the bridge switches. The switching of the inductors may be by mechanical, solid-state, optical, or magnetic switches. The magnetic switch may be a transformer winding. The switched inductor may be transformer-coupled.

7 Claims, 7 Drawing Sheets

PHASE-SHIFTED PWM BRIDGE WITH SWITCHABLE INDUCTORS TO MAINTAIN ZERO-VOLTAGE SWITCHING AT LIGHT LOAD

FIELD OF THE INVENTION

Background of the Invention

The phase-shifted pulse-width-modulated (PSPWM) resonant bridge has become a mainstay in the dc-to-dc power converter field, because it can provide low switching losses by virtue of zero-voltage switching (ZVS) at constant switching frequency. The low losses are very desirable, in that they allow the switching frequency to be high without undesirable heating of the switches. The high switching frequencies which ZVS allows in turn allows power converters to be made with physically small reactors such as capacitors and inductors.

FIG. 1 is a simplified schematic diagram of a dc-to-dc switching converter, similar to that described in "*a 1 kW 500 kHz Front-End Converter for a Distributed Power Supply System,*" by Mweene et al, published in the IEEE Transactions on Power Electronics, Vol. 6, No 3, July 1991. In FIG. 1, a first source of direct energizing voltage (or electrical potential) is illustrated by a conventional battery symbol and is designated 12. Direct energizing voltage is often referred to as direct current (dc). The dc voltage of source 12 is designated as an input voltage or Vi. Input voltage Vi is applied as +Ed to a first bus 14 relative to RTN, the second bus 16. A first inverter switching leg is designated A and includes first and second controllable switching devices, illustrated as field-effect transistors Q1 and Q2, respectively. A second inverter switching leg is designated B and includes third and fourth controllable switching devices, illustrated as field-effect transistors Q3 and Q4, respectively. The salient characteristics of the controllable switching devices is that each includes a controlled current path, which in the case of a FET is the drain-to-source path, and a control electrode, which is the gate electrode. Thus, FET Q1 is marked with the letters s, d and g to represent the source, drain, and gate electrodes. The other FETs are similarly marked. In FIG. 1, leg A is illustrated as including the "serial" or "series" combination of the drain-to-source current paths of FETs Q1 and Q2. Those skilled in the art will recognize that control of the gates of the FETs may result in lack of simultaneous current flow through both current paths, but for purposes of explanation the "serial" connection as illustrated in FIG. 1 will be understood. Leg A is illustrated as being connected "between" the buses 14 and 16. Those skilled in the art will recognize that the term "between" as used in electrical descriptions differs from the general physical meaning, in that the connection of leg A "between" buses 14 and 16 means that the legs are electrically connected to receive electric energy therefrom, not that they are physically situated between the buses. Similarly, leg B is coupled "between" buses 14 and 16. The connection of the two legs defines a "bridge" circuit designated 11.

In normal operation of a dc-to-dc converter such as that of FIG. 1, square-wave gate control signals are generated, as by a control block 18, and applied to the gates of switches Q1, Q2, Q3, and Q4 with phases selected, generally speaking, to turn ON or render conductive the controlled current paths of diagonally opposite switches of the bridge circuit 11. Thus, for example, switches Q1 and Q4 are rendered conductive while switches Q2 and Q3 are rendered nonconductive, and shortly thereafter switches Q2 and Q3 are rendered conductive while switches Q1 and Q4 are rendered nonconductive. This has the effect of alternately connecting to bus 14 and to bus 16 the A leg "tap point" At, which lies "between" switches Q1 and Q2, while simultaneously connecting to bus 14 and to bus 16, respectively, the B leg tap point Bt. This, in turn, causes tap points At and Bt to alternate, at the switching frequency, between the +Ed bus voltage and the –RTN bus voltage. The alternation of the voltages appearing at tap points At and Bt effectively produces an alternating voltage "between" the tap points.

The alternating voltage appearing between tap points At and Bt in FIG. 1 is applied to the primary winding T1$p$ of a transformer T1. More particularly, tap point At is connected by way of a transformer primary winding connection point or terminal T1$p_1$. Similarly, tap point Bt is connected to a terminal by way of a transformer primary winding connection point or terminal T1$p_2$. As illustrated, an inductance designated Lt is connected between terminals T1$p_1$ and T1$p$. Inductance Lt does not necessarily represent a discrete inductive element, but rather can represent, at least in part, the leakage inductance of transformer T1. Similarly, an inductance Lm is illustrated as being coupled "across" or in parallel with terminals T1$p_1$ and T1$p_2$. Inductance Lm represents at least the magnetizing inductance of transformer T1.

When an alternating voltage is applied from tap points At and Bt to the primary winding of transformer T1, an alternating voltage is induced or produced across secondary winding T1$s$. The alternating voltage appearing across the output or secondary winding terminals of transformer T1 is applied to a full-wave bridge rectifier designated generally as 30, which produces pulsating direct voltage on a pair of buses 31, 33. The pulsating direct voltage is applied by way of an output filter 35 including an inductor Lo and "across" an output filter capacitor Co. Filter inductor Lo and filter capacitor Co make up a low pass filter, in known fashion, to produce generally ripple-free direct output direct voltage Vo for application to a load illustrated as a resistance $R_L$.

The dc-to-dc converter 10 of FIG. 1 thus receives direct voltage from a source 12, converts the direct voltage to alternating voltage in the bridge 11, and converts the alternating voltage to a secondary alternating voltage by way of transformer T1. The magnitude of the secondary alternating voltage is be selected by the primary-to-secondary winding or turns ratio of transformer T1, and the converter duty cycle, as known in the art. The secondary alternating voltage at the secondary winding of transformer T1 is rectified and filtered to produce an output direct voltage Vo. The dc-to-dc converter 10 thus provides, by virtue of galvanic insulation of transformer T1, electrical isolation between the source of direct voltage 12 and the output direct voltage Vo. It also allows the output voltage Vo to be selected to be different from (either greater than or less than) the source voltage.

Those skilled in the art know that control of the relative phases of the control signals applied to the various controllable switches of dc-to-dc converter 10 of FIG. 1 allows the voltage generated between tap points At and Bt to be varied. This variation as a function of phase is often used as part of a feedback control system for controlling the output direct voltage Vo.

It is desirable to cause the controllable switches of the dc-to-dc converter circuit of FIG. 1 to "soft switch" or to switch from the conductive state to the nonconductive state such that, during the switching transient, high voltage and current are not simultaneously applied to the switching device. Soft switching is described generally in U.S. Pat. No. 4,864,479, issued Sep. 5, 1989 in the name of Steigerwald et al. In the arrangement of FIG. 1, the presence of energy stored in transformer leakage inductance Lt tends to promote soft switching as described in the aforementioned Steigerwald et al. patent. Mweene et al. describe switching converter operation as phase-shifted pulse-width modulation (PSPWM), in which either the two upper or two lower controllable switches are left conductive or ON during the free-wheeling period, so that the load and magnetizing currents can continue to flow in the primary winding T1$p$. The Mweene et al. switching operation is described in conjunction with the amplitude-time waveforms of FIGS. 2A, 2B, 2C, 2D, 2E, 2F, and 2H. FIGS. 2A and 2B illustrate the voltages at tap points At and Bt, respectively, of FIG. 1, for approximately a 70% duty ratio or cycle, as periodically taking on the value of +Vin (corresponding to +Ed) or zero (corresponding to −RTN).

Some periods exist during which both tap points At and Bt are at the same voltage, both at +Ed or both at zero (corresponding to −RTN). FIG. 2C plots the voltage $V_{AB}$ (or $v_A$-$v_B$) "between" nodes or taps At and Bt, which energizes the primary winding of the transformer T1. FIG. 2D plots the pulsating direct voltage VX, which appears at the rectifier bridge output point X (relative to the negative terminal of output capacitor Co) of FIG. 1 as a result of the application of $V_{AB}$ to the transformer T1. FIG. 2E plots the magnetizing current $I_M$ of transformer T1. The magnetizing current increases (becomes more positive) substantially linearly during those intervals in which $V_{AB}$ is positive, remains substantially constant when $V_{AB}$ is zero, and decreases (becomes more negative) during those intervals in which $V_{AB}$ takes on a negative value. FIG. 2F plots the primary winding current IP of transformer T1. FIG. 2G plots as a solid line the gate-to-source voltage of controllable switch Q1, and as a dotted line the gate-to-source voltage of controllable switch Q2. FIG. 2H plots as a solid line the gate-to-source voltage of controllable switch Q4, and as a dotted line the gate-to-source voltage of controllable switch Q3.

As described by Mweene et al., zero-voltage switching results from operation in which, if Q1 and Q4 are ON (the controllable current paths are conductive), and then Q1 is turned OFF (controllable current path rendered nonconductive), the load and magnetizing current (referred to the transformer primary and together designated Ip) that had been flowing in through the channel or controllable current path of Q1 commutate to the parasitic capacitance of node or tap At. This capacitance is the parallel combination of output capacitances of switches Q1 and Q2, transformer parasitic capacitances, and the reflected junction capacitances of two OFF-state rectifiers, namely rectifiers D2 and D3. The voltage at node At falls as the current Ip discharges the combined capacitance until the capacitance voltage reaches the voltage of the bottom rail or bus 16, at which time the capacitance voltage is clamped to the bottom rail 16 voltage by the inherent antiparallel diode of switch Q2. This transition is essentially lossless. At any time during the freewheeling period, switch Q2 can be turned ON losslessly with zero volts across its controlled current path (the drain-to-source path), so long as the transition of Q2 takes place after the turn-OFF of Q1, so as to avoid disrupting the lossless discharge of the capacitance of node At. At the end of the freewheeling interval, switch Q4 is turned OFF, and current flowing in the primary winding T1$p$ commutates to the parasitic capacitances of node Bt. As the voltage across the transformer becomes negative, the secondary-side currents commutate from the diode D1-D4 path to the diode D2-D3 path. For a period of time, all the diodes D1 through D4 are ON, and the voltage across the transformer secondary winding T1$s$ is essentially zero. The voltage at node Bt, and therefore the transformer voltage, appear across the transformer leakage inductance Lt. The leakage inductance is illustrated as being on the primary side for ease of explanation.

As can be seen from the timing diagrams of FIGS. 2A through 2H, all four controllable switches Q1 through Q4 are driven with close to a 50% duty cycle or ratio. The drives for Q1 and Q2 are opposite square-waves, with sufficient dead time at each transition to permit completion of the lossless charging of node At. Similarly, the drives Q3 and Q4 are also opposite square-waves with dead times. Control of the duty cycle of the H-bridge 11, the drives for the A and B legs are mutually shifted in time. During those intervals in which the two drives are 180° out-of-phase (meaning that Q4 is ON whenever Q1 is ON), the duty ratio is essentially 100%. When the two drives are in-phase (Q3 is ON whenever Q1 is ON), the duty ratio is zero. Control of the relative drive phase of the legs allows control of the output direct voltage, and the above-mentioned feedback control senses the output voltage and compares it with a reference to generate an error signal, which in turn is used to control the output voltage in a degenerative manner.

As described by Mweene et al., a resonance between the magnetizing inductance of the transformer T1 and the node Bt capacitance takes place, and with proper selection of values can achieve peak voltages greater than the applied or bus voltage. When the voltage of the parasitic capacitance at node Bt exceeds the applied voltage Vi, the inherent antiparallel diode of switch Q3 turns ON and clamps the resonant voltage until the leakage inductance current falls below zero. During this clamping interval, switch Q3 can be turned ON losslessly.

Mweene et al. further indicate that the choice of the sum of the magnetizing and load current can affect the loss of the switching transitions. The magnetizing current always has the same value, which depends upon the applied voltage Vi and the amount of phase shift between legs A and B. The load current, however, can vary by large amounts, which can adversely affect the ability to zero-voltage switch (ZVS) at low or zero load currents. Zero-voltage switching is very desirable both to maintain low losses in the power switches and in the inverse-parallel diodes of FETs when used as power switches, and tends to reduce electromagnetic interference (EMI) attributable to the switching of significant currents. The power converter regulates the output voltage. At light load the power converter has a small duty ratio, so the magnetizing current is also small, thus there is not sufficient energy for zero-voltage switching under light load operation. The loss of zero-voltage switching leads to greatly increased switching loss, and a corresponding decrease in power converter efficiency. This loss of zero-voltage switching also is electrically noisy, and leads to EMI difficulties.

Improved or alternative dc-to-dc converters are desired.

SUMMARY OF THE INVENTION

A dc-to-dc converter according to an aspect of the invention comprises first and second controllable switches. Each controllable switch includes a controllable current path and a control input port. The controllable current paths of the first and second controllable switches are connected as a first half-bridge with a first tap, a first connection node adjacent the first controllable switch and remote from the first tap, and a second connection node adjacent the second controllable switch and remote from the first tap. The first connection node is connected to energizing voltage of a first polarity from a first terminal of a source of direct energizing voltage, and the second connection node is connected to energizing voltage of a second polarity from the source of direct energizing voltage.

The dc-to-dc converter includes third and fourth controllable switches, each including a controllable current path and a control input port. The controllable current paths of the third and fourth controllable switches are connected as a second half-bridge with a second tap, a third connection node adjacent the third controllable switch and remote from the second tap, and a fourth connection node adjacent the fourth controllable switch and remote from the second tap. The third connection node is connected to energizing voltage of the first polarity from the first terminal of the source of direct energizing voltage, and the fourth connection node is connected to energizing voltage of the second polarity from the source of direct energizing voltage. A phase-shift pulse-width-modulated controller is coupled to the control input ports of the first, second, third, and fourth controllable switches, for switching the first, second, third, and fourth controllable switches so that a fixed-frequency alternating voltage appears between the first and second taps of the half-bridges with a duty cycle selected to provide the desired load current. The dc-to-dc converter includes an output transformer including primary and secondary windings. The primary winding of the output transformer is coupled to the first and second taps, so that the alternating voltage is applied to the primary winding of the output transformer. A full-wave rectifier is connected to the secondary winding of the output transformer, for rectifying secondary winding current flowing under the impetus of the alternating voltage. A filter is coupled to the full-wave rectifier for producing output direct voltage for application to a load. A controllable fifth switch and a capacitance are also provided. A first inductance element is serially coupled with the controllable fifth switch and with the capacitance to thereby define a switched serial combination. The switched serial combination is coupled between the first tap and a reference potential. A fifth switch controller is coupled to the controllable fifth switch, for switching the fifth switch into conduction during those intervals in which the load current is less than a selected value and for switching the controllable fifth switch into a nonconductive state during those intervals in which the load current exceeds the selected value. In a particular embodiment of this aspect of the invention, the first inductance element is an inductor and the fifth switch includes a switched current path and at least a conduction control terminal or port by which the conduction state of the switched current path can be controlled. Alternatively, the first inductance element may include a component attributable to the characteristics of the second transformer. In a particularly advantageous embodiment of this aspect of the invention, the controllable fifth switch comprises a switch transformer including first and second mutually coupled windings, where the first winding of the switch transformer is serially coupled with the capacitance and the first inductance element, and the second winding of the switch transformer is coupled to the fifth switch controller. In a most preferred embodiment of the invention, the dc-to-dc converter further comprises a controllable sixth switch and a second capacitance. A second inductance element is serially coupled with the controllable sixth switch and with the second capacitance to thereby define a second switched serial combination, which second switched serial combination is coupled between the second tap and a reference potential. A sixth switch controller is coupled to the controllable sixth switch, for switching the sixth switch into conduction during those intervals in which the load current is less than a selected value and for switching the controllable sixth switch into a nonconductive state during those intervals in which the load current exceeds the selected value.

A dc-to-dc converter according to another aspect of the invention comprises first and second controllable switches, each controllable switch including a controllable current path and a control input port. The controllable current paths of the first and second controllable switches are connected as a first half-bridge with a first tap, a first connection node adjacent the first controllable switch and remote from the first tap, and a second connection node adjacent the second controllable switch and remote from the first tap. The first connection node is connected to energizing voltage of a first polarity from a first terminal of a source of direct energizing voltage, and the second connection node is connected to energizing voltage of a second polarity from the source of direct energizing voltage. The dc-to-dc converter further includes third and fourth controllable switches, each including a controllable current path and a control input port. The controllable current paths of the third and fourth controllable switches are connected as a second half-bridge with a second tap, a third connection node adjacent the third controllable switch and remote from the second tap, and a fourth connection node adjacent the fourth controllable switch and remote from the second tap. The third connection node is connected to energizing voltage of the first polarity from the first terminal of the source of direct energizing voltage, and the fourth connection node is connected to energizing voltage of the second polarity from the source of direct energizing voltage. A phase-shift pulse-width-modulated controller is coupled to the control input ports of the first, second, third, and fourth controllable switches, for switching the first, second, third, and fourth controllable switches so that a fixed-frequency alternating voltage appears between the first and second taps of the half-bridges with a duty cycle selected to provide the desired load current. The dc-to-dc converter further includes an output transformer including primary and secondary windings. The primary winding of the output transformer is coupled to the first and second taps, so that the alternating voltage is applied to the primary winding of the output transformer. A full-wave rectifier is connected to the secondary winding of the output transformer, for rectifying secondary winding current flowing under the impetus of the alternating voltage. A filter is coupled to the full-wave rectifier for producing output direct voltage for application to a load. The dc-to-dc converter further comprises an inductance, a capacitor, and a second transformer including first and second mutually coupled windings. The first coupled winding of the second transformer is coupled in series with the capacitor between the first tap and a reference potential. The inductance is switchably coupled with the second winding of the second transformer. A controller is coupled to the inductance and to the second winding of the second transformer in such a manner that during those intervals in which the load current exceeds a particular value, the second winding of the second transformer is open-circuited, and such that during those intervals in which the load current is less than the particular value, the second winding of the second transformer is coupled in series with the inductance.

In a particular embodiment of this other aspect of the invention, the dc-to-dc converter further comprises a second inductance, a second capacitor, and a third transformer including first and second mutually coupled windings. The first coupled winding of said third transformer is coupled in series with the second capacitor between said first tap and a reference potential. The second inductance is switchably coupled with the second winding of the third transformer. A second controller is coupled to the second inductance and to said second winding of the second transformer in such a manner that during those intervals in which the load current exceeds a particular value, the second winding of the second transformer is open-circuited, and such that during those intervals in which the load current is less than the particular value, the second winding of the second transformer is coupled in series with the second inductance. The second controller may include a second rectifier.

DESCRIPTION OF THE INVENTION

Figure 1:
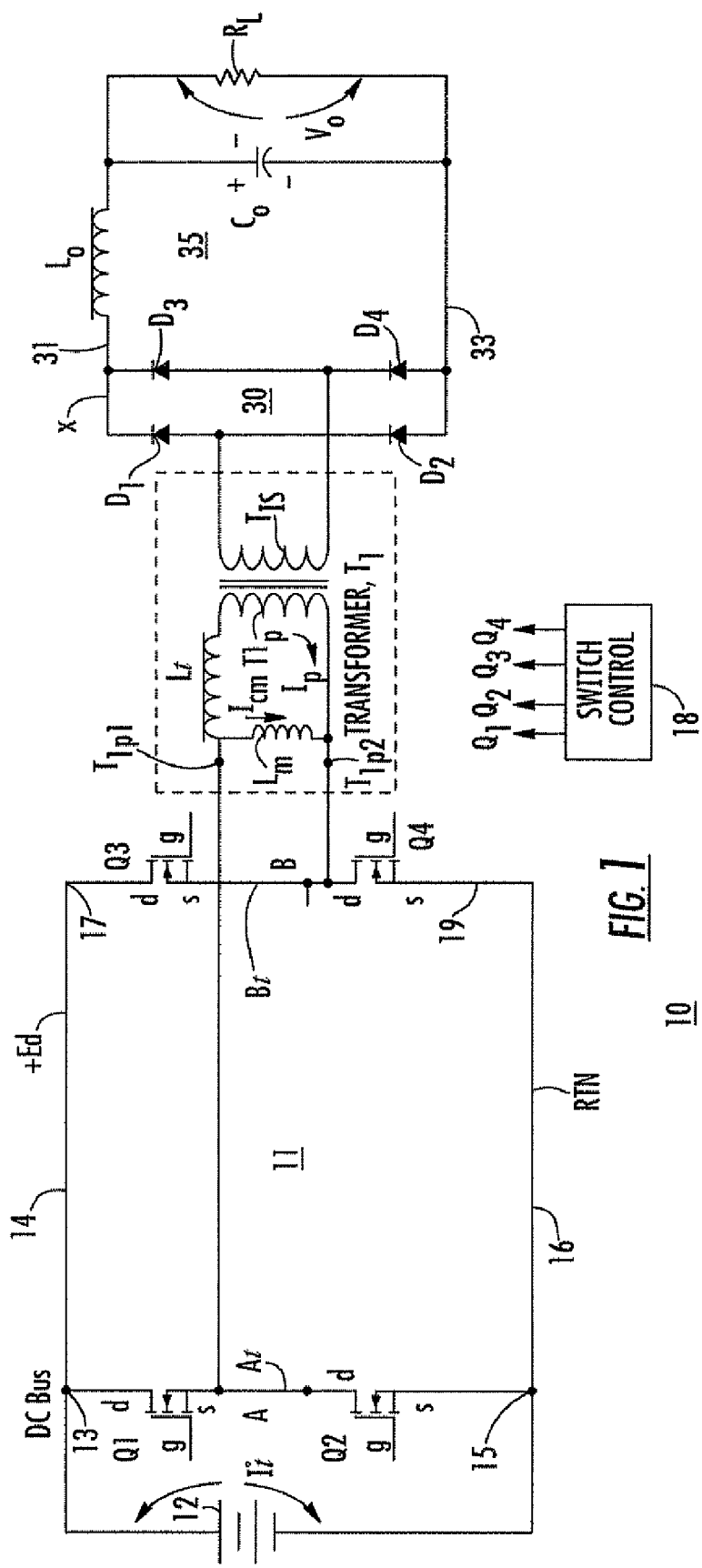
FIG. 1 is a simplified schematic diagram of a prior-art dc-to-dc phase-shifted pulse-width-modulated switching converter.
Figure 3:
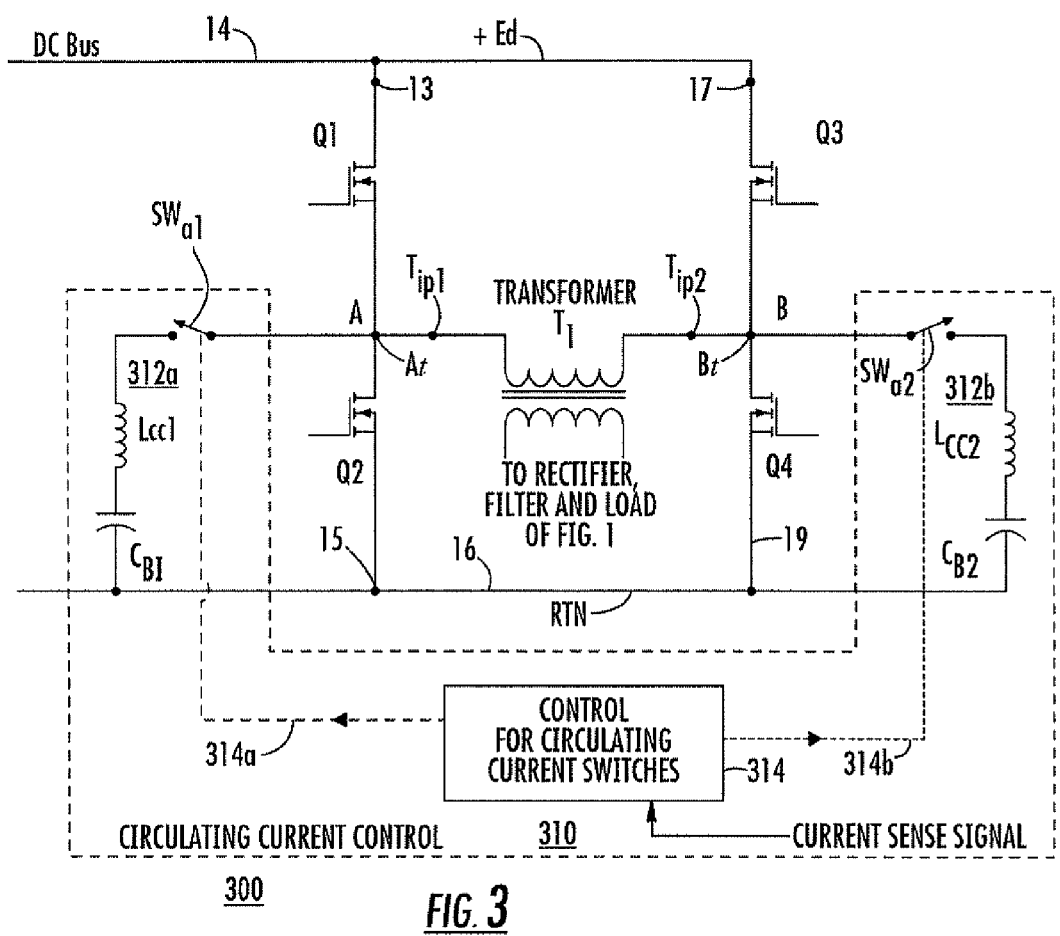
FIG. 3 is a simplified block diagram of a portion of a phase-shifted PWM bridge dc-to-dc converter according to an aspect of the invention, in which mechanical switches are used to explain the switching of an inductor in circuit with the converter.

FIG. 3 is a simplified block diagram of a portion of a phase-shifted PWM bridge dc-to-dc converter according to an aspect of the invention, in which mechanical switches are used to explain the operation of the converter. Elements of FIG. 3 corresponding to those of FIG. 1 are designated by the same reference alphanumerics (letters and/or numbers). In FIG. 1, circulating current control is accomplished within dash-line block 310 by means of switches illustrated by mechanical single-pole single-throw switches SWa1 and SWa2. The switches are illustrated as being in the "OPEN" or nonconductive state. Those skilled in the art know that mechanical switches are limited in their frequency response, and that in the context of a switching power converter solid-state or electronic switches may be more appropriate. However, if the switching rate of a power converter happens to be within the operating range of a mechanical switch, it may be used. In any case, mechanical switches are often used for purposes of explanation and their use will be understood.

In FIG. 3, circulating current control switch SWa1 is connected in series with a circulating current inductor Lcc1 and with a direct-voltage blocking capacitor $C_{B1}$ to thereby form a first switched blocked serial circulating current path 312a. First switched blocked serial circulating current path 312a is connected between tap At and a reference potential, which may be RTN bus 16. Those skilled in the art know that the reference potential might also be +Ed bus 14. Similarly, circulating current control switch SWa2 is connected in series with a circulating current inductor Lcc2 and with a direct-voltage blocking capacitor $C_{B2}$ to thereby form a first switched blocked serial circulating current path 312b. First switched blocked serial circulating current path 312b is connected between tap Bt and a reference potential, which may be RTN bus 16. The reference potential might also be +Ed bus 14. It is assumed in the following discussion that the dc voltages on blocking capacitors CB1 and CB2 are equal to ½ the dc bus voltage, Ed. In practice this voltage can easily be established by a resistive voltage divider (not illustrated) as is well known in the art and as is described, for example, in a copending patent application entitled "PHASE-SHIFTED BRIDGE WITH AUXILIARY CIRCUIT TO MAINTAIN ZERO-VOLTAGE-SWITCHING," filed in the names of Schutten and Steigerwald. Circulating current inductors SWa1 and SWa2 are controlled in parallel or in common by a controller illustrated as a block 314, as suggested by dash lines 314a and 314b. That is, control 314 for the circulating current switches SWa1 and SWa2 receives control signals from a source (not illustrated in FIG. 3) indicating those times in which the load current is below a given value, or correspondingly in which the duty cycle is such as to generate little alternating voltage between tap points At and Bt, and in response to such signals renders the circulating current control switches conductive. In general, control signals 314a and 314b may be common or may be energized at two different levels of load current or duty cycle to achieve optimum performance. For example, one leg of the inverter may need the additional circulating current to maintain soft switching sooner than the other leg.

As mentioned, during those intervals in which the load current is small, corresponding to those intervals in which the equivalent load resistance is high or the duty cycle is such as to generate small voltages across tap points At and Bt, the current flowing in the magnetizing inductance Lm and leakage inductance Lt of output transformer T1 of FIG. 1 is reduced by comparison with those intervals in which the load current is large. This reduction of current in the leakage and magnetizing inductances of the output transformer at light load in turn reduces the energy available for zero-voltage switching (ZVS) of the power switches Q1, Q2, Q3, and Q4. As a consequence, the power switches may be forced by lack of current into a disadvantageous operating range, in which the power dissipated and the stresses on the power switches increase, thereby tending to decrease converter efficiency, increase the semiconductors' temperatures and reduce the reliability of the converter. This problem is solved by the switched circulating current arrangement of FIG. 3, as at low load the circulating current switches SWa1 and SWa2 are switched into conduction, thereby connecting circulating current inductors Lcc1 and Lcc2 in circuit. With circulating current inductors Lcc1 and Lcc2 in the circuit, alternating current flows. More particularly, substantial circulating current now is present in inductors Lcc1 and Lcc2 which store energy that will maintain ZVS soft switching for switches Q1 through Q4 and their inherent inverse parallel diodes, well known in the art. These diodes are not shown in the diagram. This circulating current acts as if there were additional magnetizing current. This "equivalent" magnetizing current however can be predesigned or preselected to be the value known to be sufficient to maintain ZVS soft switching at the light load condition.

Figure 4:
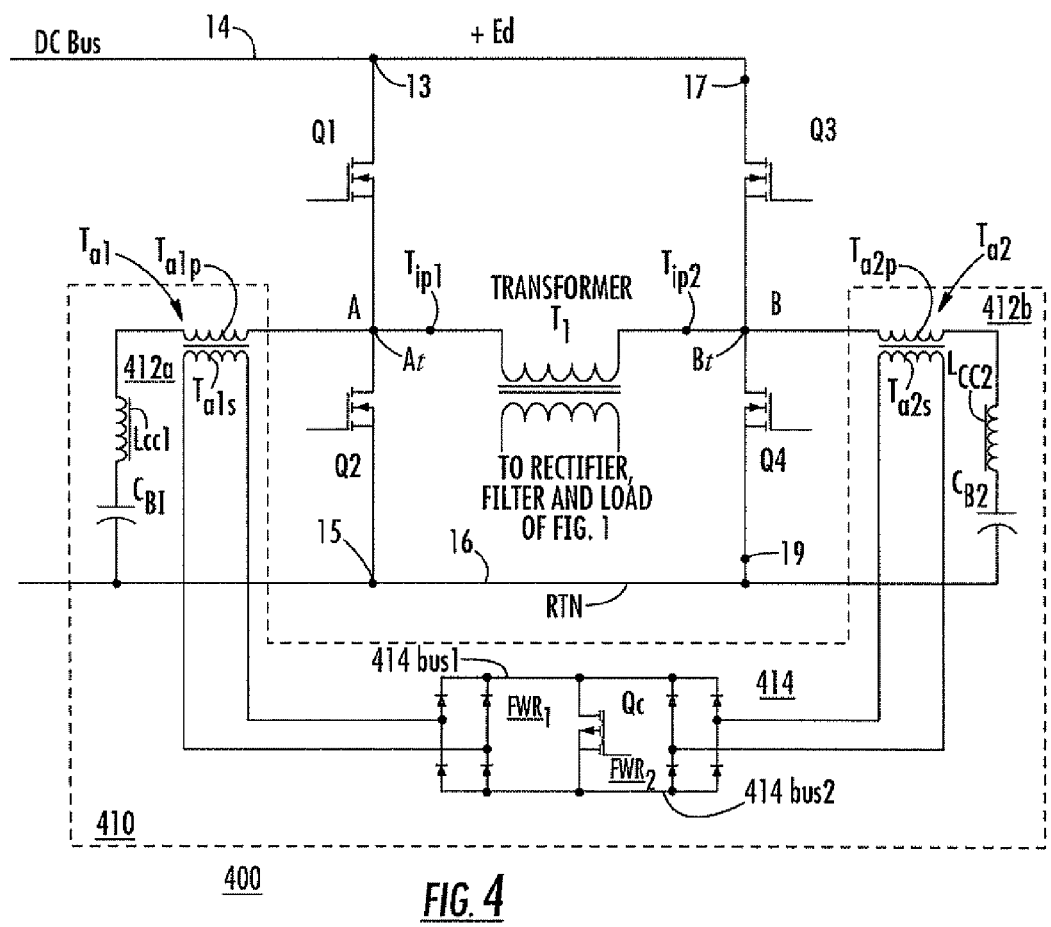
FIG. 4 is a simplified representation of a portion of a dc-to-dc converter, which generally operates in much the same way as that of FIG. 3, but which uses a transformer switch in place of the mechanical switch of FIG. 3.

The arrangement of FIG. 4 is a simplified representation of a portion of a dc-to-dc converter, which generally operates in much the same way as that of FIG. 3. That is, the arrangement of FIG. 4 switches circulating current inductors Lcc1 and Lcc2 in-circuit during those intervals in which the load on the converter is low. In FIG. 4, the primary winding of a transformer acts as a switching element in series with the circulating current inductor and with a blocking capacitor. More particularly, the primary winding Ta1p of a transformer Ta1 is connected in series with the circulating current inductor Lcc1 and with a blocking capacitor CB1 to form or define a first series combination 412a. Series combination 412a is connected at one end to tap At and at the other end to a point of reference potential, which in the illustration is the RTN bus 16. Similarly, the primary winding Ta2p of a transformer Ta2 is connected in series with the circulating current inductor Lcc2 and with a blocking capacitor CB2 to form or define a second series combination 412b. Series combination 412b is connected at one end to tap Bt and at the other end to a point of reference potential, which in the illustration is the RTN bus 16.

Control of the impedance of the primary windings Ta1p and Ta2p of transformers Ta1 and Ta2, respectively, of FIG. 4 is accomplished by either open-circuiting or short-circuiting the secondary windings Ta1s and Ta2s, respectively. Thus, when secondary windings Ta1s and Ta2s are short-circuited, the impedance seen at the primary winding terminals of the respective primary windings Ta1p and Ta2p are reduced to a minimum value (being essentially equal to the leakage inductances of the transformers), and when the secondary windings Ta1s and Ta2s are open-circuited, the impedance seen at the respective primary windings Ta1p and Ta2p are increased to a maximum value, which maximum value is essentially equal to the primary winding magnetizing inductances. This has the effect of switching the effective resistance of a series element from a low value to a large value in response to the state of the secondary windings, which effectively switches the circulating current inductors in or out of circuit. Thus, a transformer such as Ta1 can act as a switch element, with one of the windings, such as winding T1ap, providing the switch function, and the other winding, such as T1as, providing the control function.

Control of the impedance presented to the secondary windings of transformers Ta1 and Ta2 of FIG. 4 is accomplished by rectifiers and a solid-state auxiliary or fifth switch Qc. More particularly, a full-wave rectifier $FWR_1$ is connected to secondary winding Ta1s of transformer Ta1, and a full-wave rectifier $FWR_2$ is connected to secondary winding Ta2s of transformer Ta2. The application of alternating voltage to series combinations 412a and 412b of FIG. 4 results in generation of alternating voltage at the secondary windings Ta1s and Ta2s of transformers Ta1 and Ta2, respectively. Full-wave rectifier $FWR_1$ rectifies the alternating voltage from secondary winding Ta1s to produce a positive voltage on a sub-bus 414bus1 relative to the voltage on a sub-bus 414bus2. Similarly, full-wave rectifier $FWR_2$ rectifies the alternating voltage from secondary winding Ta2s to produce a positive voltage on a sub-bus 414bus1 relative to the voltage on a sub-bus 414bus2. Thus, both rectifiers produce a positive voltage on sub-bus 414bus1 relative to the voltage on a sub-bus 414bus2. It is a simple matter to selectively short-circuit the secondary windings by short-circuiting the sub-bus 414bus1 to sub-bus 414bus2. A simple controlled electronic switch such as a FET Qc can be controlled by its control electrode or gate (not separately designated) in response to the load. More particularly, FET Qc is rendered conductive in the presence of a light load on the dc-to-dc converter to thereby short-circuit the secondary windings Ta1s and Ta2s. This in turn reduces the impedance presented by primary windings Ta1p and Ta2p to their respective series circuits 412a and 412b. The reduced impedance presented by primary windings Ta1p and Ta2p to their respective series circuits 412a and 412b, in turn, allows increased flow of circulating current through the series circuits 412a and 412b relative to when the secondary windings are open-circuited.

FET Qc of FIG. 4 is rendered nonconductive in the presence of a heavy load on the dc-to-dc converter to thereby open-circuit the secondary windings Ta1s and Ta2s. This in turn increases the impedance presented by primary windings Ta1p and Ta2p to their respective series circuits 412a and 412b. The increased impedance presented by primary windings Ta1p and Ta2p to their respective series circuits 412a and 412b, in turn, reduces flow of circulating current through the series circuits 412a and 412b relative to when the secondary windings are short-circuited. The increasing and decreasing of the flow of circulating current in response to the open- or short-circuit condition of the secondary windings results in an effective switching of the series circuits 412a and 412b in and out of circuit, respectively.

Figure 5:
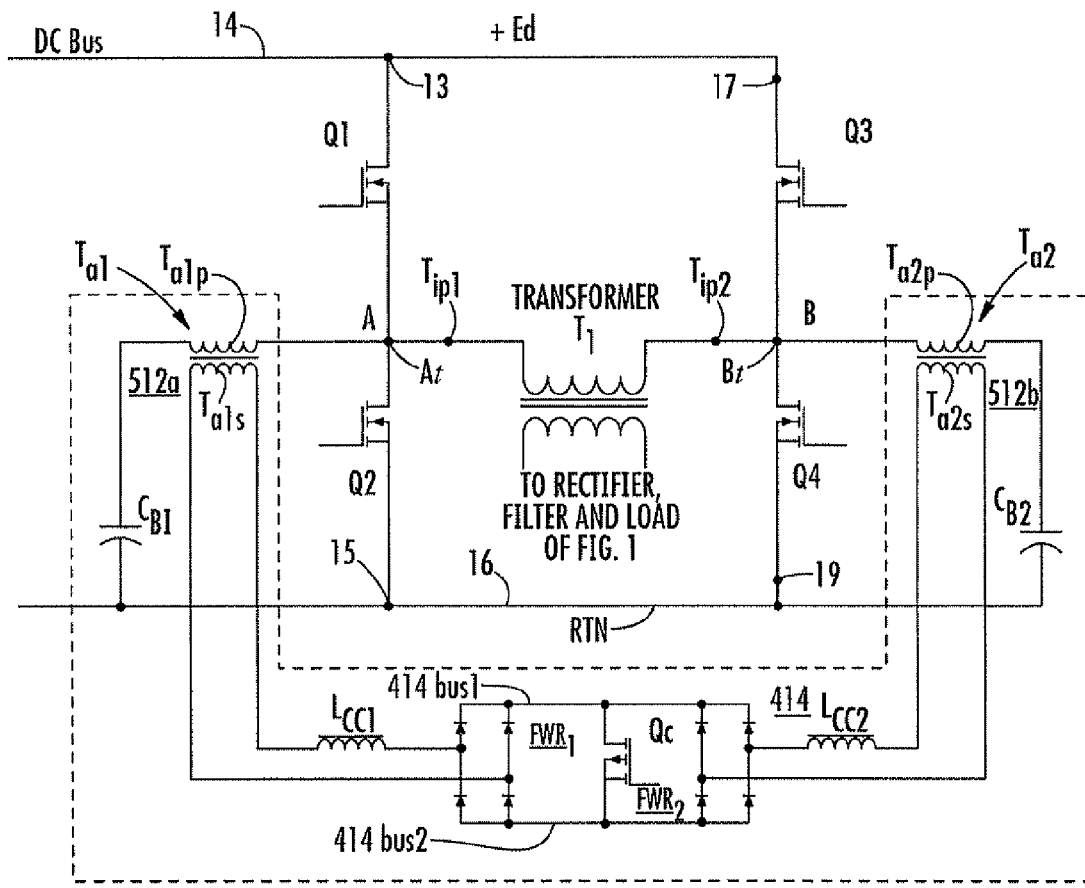
FIG. 5 is generally similar to FIG. 4, but places the inductor on a control side of the transformer switch.

According to another aspect of the invention, the location of the circulating current inductors can be selected in a transformer-switched arrangement to reduce the inductance required to achieve zero-voltage-switching. FIG. 5 illustrates a transformer-switched arrangement generally similar to that of FIG. 4. Elements of FIG. 5 corresponding to those of FIG. 4 are designated by like reference alphanumerics. It should be understood that the values of the inductance, capacitance, voltage and current may differ for the same elements in FIGS. 4 and 5 because of the effects of impedance transformation in transformers Ta1 and Ta2. In fact, this is one of the advantages of the arrangement of FIG. 5 by comparison with that of FIG. 4. More particularly, circulating current inductor Lcc1 in FIG. 5 is connected between secondary winding Ta1s and full-wave rectifier $FWR_1$. Similarly, circulating current inductor Lcc2 is connected between secondary winding Ta2s and full-wave rectifier $FWR_2$. In these positions, the inductance of the circulating current inductors is transformed by the turns ratio of the transformers and can be made to appear as a larger inductance on the primary side during those intervals in which the control circuit switch Qc is short-circuited. More particularly, during those intervals in which the load current of the dc-to-dc converter is small and switch Qc is low impedance or shorted, the short-circuit is "reflected" through the full-wave rectifiers $FWR_1$ and $FWR_2$, so that circulating current inductor Lcc1 is effectively applied across the terminals of secondary winding Ta1s, and circulating current inductor Lcc2 is effectively applied across the terminals of secondary winding Ta2s. With this effective application of the circulating current inductors across the secondary windings of the transformers, the current flowing in the primary windings Ta1p and Ta2p of the transformers Ta1 and Ta2, respectively, effectively flows through the transformed impedance of the circulating current inductor Lcc1 and Lcc2, respectively. If the primary winding of the transformers has a larger number of turns than the secondary winding, the transformation of voltage from the primary side to the secondary side is step-down. That is, the impedance on the secondary side of the transformer is lower than that on the primary side. With this kind of turns ratio, an impedance on the secondary side, when transformed or reflected to the primary side, will appear larger. The net effect is that, with a number of primary windings greater than the number of secondary windings in transformers Ta1 and Ta2, the impedance of the associated circulating current inductors as seen from the primary winding side of the transformers will be larger than the actual impedance of the circulating current inductor. Thus, a relatively small inductance can be made to provide the effect of a larger inductance for purposes of circulating current maintenance. Note that the inductors physical size is theoretically the same on either side, i.e. more or less proportional to $LI^2$. However, selection of one side or other may lead to a simpler physical design. The inductance could also be built into the transformer as leakage inductance.

Figure 6:
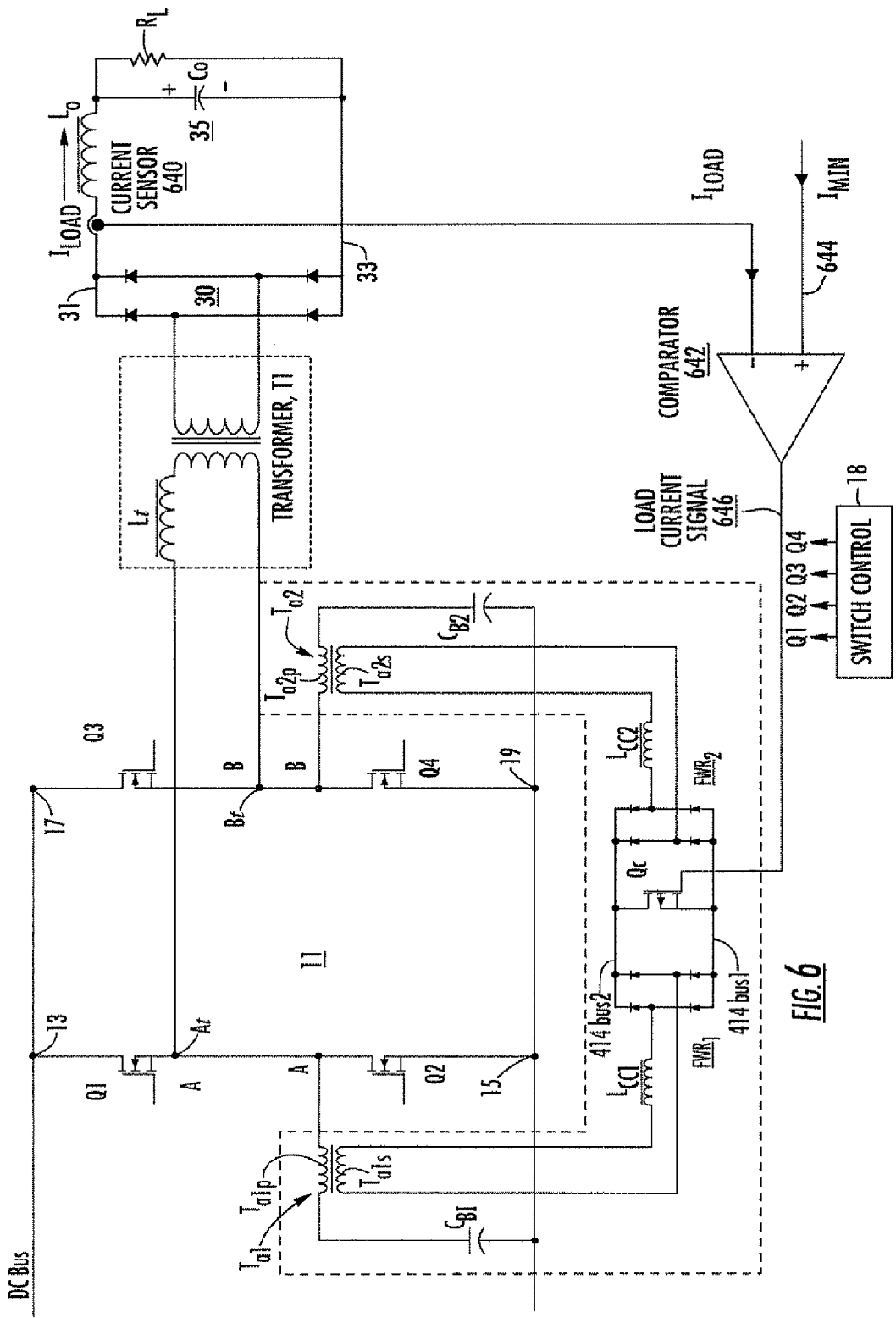
FIG. 6 is a simplified block diagram of a converter according to an aspect of the invention, illustrating a control scheme responsive to the load current.

FIG. 6 is a simplified diagram in block and schematic form of an arrangement similar to that of FIG. 5, and corresponding elements are designated by like reference alphanumerics. In FIG. 6, a current sensor designated 640 is serially coupled with the filter 35 for sensing the load current $I_{LOAD}$. More particularly, the current sensor 640 is coupled in series with output filter inductor Lo. In this position, it will experience more ripple than it might if placed between filter 35 and the load $R_L$. A comparator 642 has its inverting (−) input terminal coupled to receive the current-representative signal from current sensor 640 and has its noninverting (+) input terminal coupled to receive a reference voltage designated $I_{MIN}$, which represents the load current at which it is desired to switch the switchable inductors Lcc1 and Lcc2 into and out of circuit. When the load current $I_{LOAD}$ exceeds a predetermined value, comparator 642 produces an output voltage which tends toward a negative limit value. This negative limit value is insufficient to render control switch FET $Q_c$ conductive, so the inductors Lcc1 and Lcc2 are not placed in circuit with the windings Ta1s and Ta2s. When the load current $I_{LOAD}$ signal applied to comparator 642 is less than the value selected for $I_{MIN}$, the comparator produces at its output a voltage that tends toward a high limit. This voltage is sufficient to render control switch Qc conductive. When switch Qc is conductive, inductors Lcc1 and Lcc2 are placed in-circuit with their respective transformers Ta1 and Ta2, respectively. With the inductors in-circuit, the alternating voltage at each tap At and Bt causes current to flow and energy storage in the inductors, which in turn allows zero-voltage switching to be accomplished notwithstanding the low load current.

It should be noted that the $I_{MIN}$ reference applied to the comparator 642 of FIG. 6 may be a variable quantity to cause the minimum current point to change as a variable function. For example, it might be desirable to change the value of $I_{MIN}$ in the event that the inverter input voltage varies.

Figure 7:
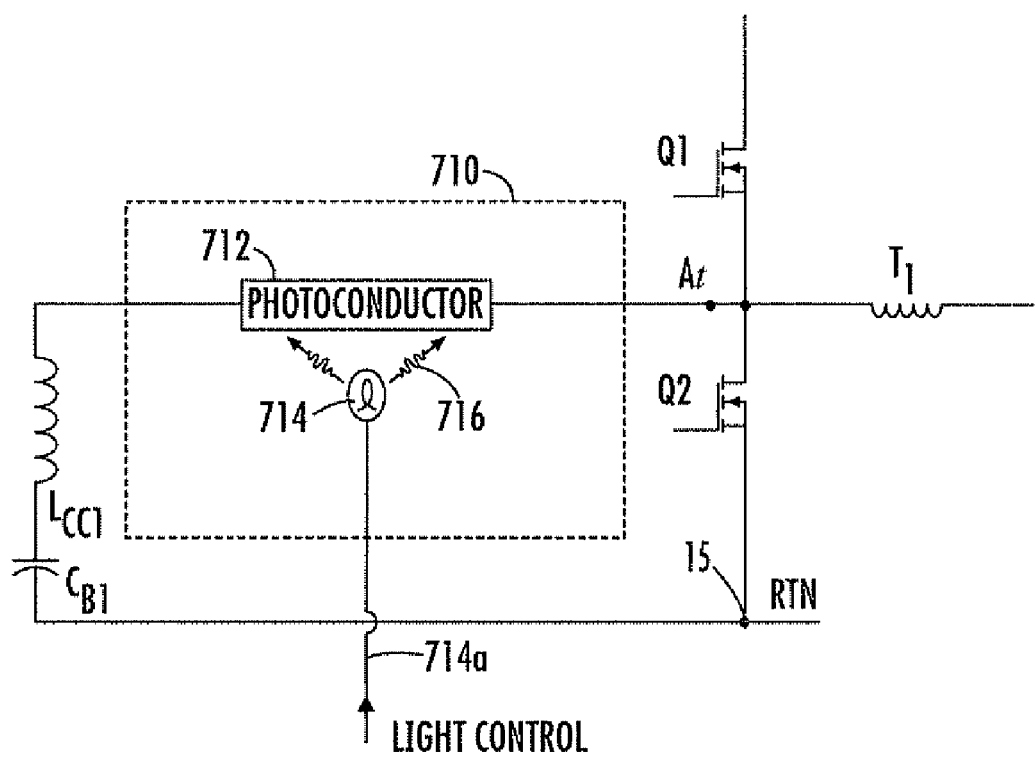
FIG. 7 is a simplified block diagram illustrating how a solid-state device in the form of a photocell can be used to switch the inductor in-circuit with the converter.

FIG. 7 is a simplified diagram illustrating the use of a solid-state switch in place of a mechanical switch as in FIG. 3. In FIG. 7, elements corresponding to those of FIG. 3 are designated by like alphanumerics. In FIG. 7, the switch element is designated 710, and includes a photoconductor illustrated as a block 712 and a light source 714 illustrated by a conventional light bulb symbol. Those skilled in the art know that suitable switching devices may include light-operated relays, optoisolators, and the like. In FIG. 7, light source 714 is fed with electrical power by way of a conductor 714a. When light power is applied from a controller by way of conductor 714a, light source 714 produces light, which is represented by photon symbols 716. The photons impinge upon the photoconductor 712 and render it electrically conductive, which is the equivalent of "closing" a switch or rendering a switch conducting. Those skilled in the art will recognize that other types of solid-state or semiconductor switches may be used instead.

Figure 2A:
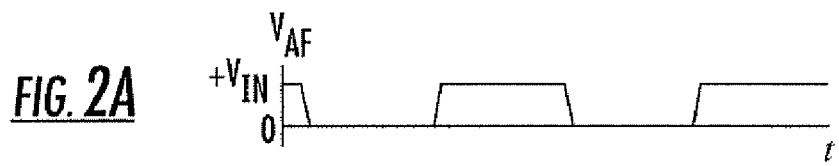
FIGS. 2A, 2B, 2C, 2D, 2E, 2F, 2G, and 2H are plots of voltage or current waveforms which are associated with the converter of FIG. 1.
Figure 2B:
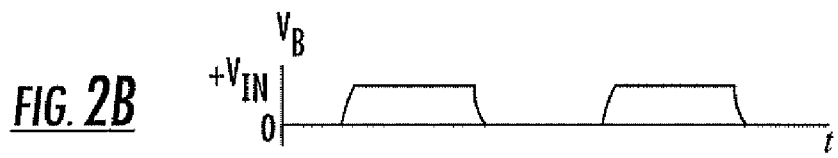
Figure 2C:
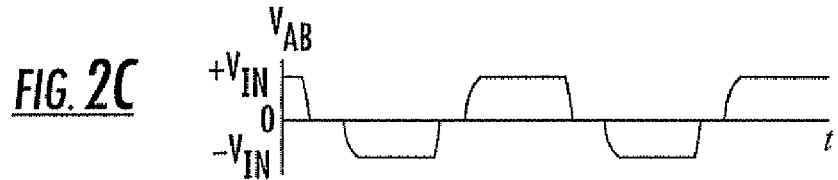
Figure 2D:
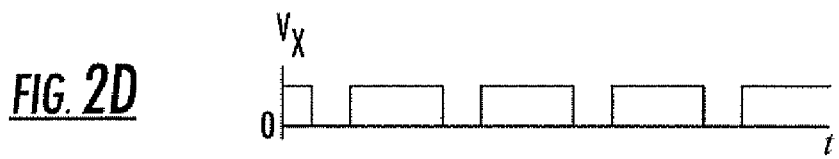
Figure 2E:
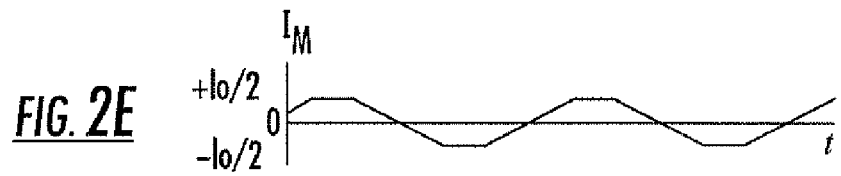
Figure 2F:
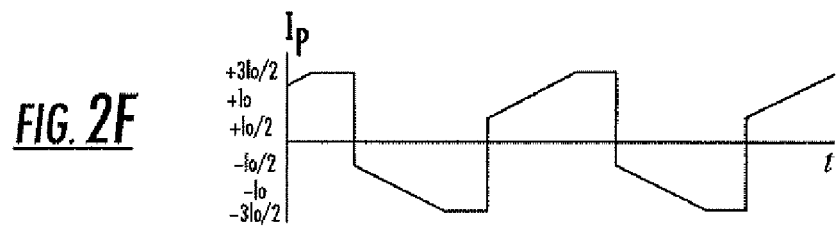
Figure 2G:
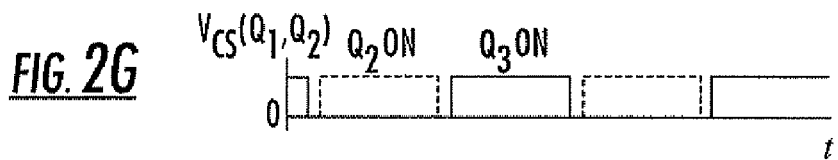
Figure 2H:
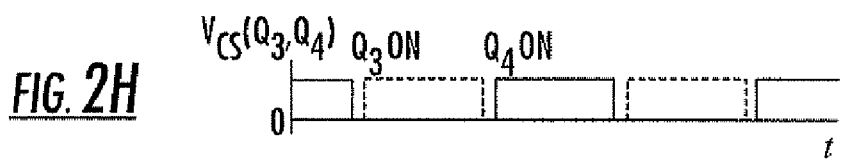

A dc-to-dc converter (300, 400, 500) according to an aspect of the invention comprises first (Q1) and second (Q2) controllable switches. Each controllable switch includes a controllable current path (drain-to-source) and a control input port (gate). The controllable current paths of the first (Q1) and second (Q2) controllable switches are connected as a first half-bridge (A) with a first tap (At), a first connection node (13) adjacent the first controllable switch (Q1) and remote from the first tap (At), and a second connection node (15) adjacent the second controllable switch and remote from the first tap (At). The first connection node (13) is connected to energizing voltage (Vi) of a first polarity (+) from a first terminal of a source (12) of direct energizing voltage, and the second connection node (15) is connected to energizing voltage of a second polarity (−) from the source (12) of direct energizing voltage. The dc-to-dc converter (300, 400, 500) includes third (Q3) and fourth (Q4) controllable switches, each including a controllable current path (drain-to-source) and a control input port (gate). The controllable current paths of the third (Q3) and fourth (Q4) controllable switches are connected as a second half-bridge (B) with a second tap (Bt), a third connection node (17) adjacent the third controllable switch (Q3) and remote from the second tap (Bt), and a fourth connection node (19) adjacent the fourth controllable switch (Q4) and remote from the second tap (Bt). The third connection node is connected to energizing voltage (Vi) of the first polarity (+) from the first terminal of the source (12) of direct energizing voltage, and the fourth connection node (19) is connected to energizing voltage of the second polarity (−) from the source (12) of direct energizing voltage. A phase-shift pulse-width-modulated controller (18) is coupled to the control input ports (gates) of the first (Q1), second (Q2), third (Q3), and fourth (Q4) controllable switches, for switching the first (Q1), second (Q2), third (Q3), and fourth (Q4) controllable switches so that a fixed-frequency alternating voltage (FIG. 2C) appears between the first (At) and second (Bt) taps of the half-bridges with a duty cycle selected to provide the desired load current. The dc-to-dc converter (300, 400, 500) includes an output transformer (T1) including primary (T1p) and secondary (T1s) windings. The primary winding (T1p) of the output transformer (T1) is coupled to the first (At) and second (Bt) taps, so that the alternating voltage (FIG. 2C) is applied to the primary winding (T1p) of the output transformer (T1). A full-wave rectifier (30) is connected to the secondary winding (T1s) of the output transformer (T1), for rectifying secondary winding current flowing under the impetus of the alternating voltage (FIG. 2C). A filter (35) is coupled to the full-wave rectifier (30) for producing output direct voltage for application to a load ($R_L$). A controllable fifth switch (SWa1; Ta1p) and a capacitance ($C_{B1}$) are also provided. A first inductance element ($L_{cc1}$) is serially coupled with the controllable fifth switch (SWa1; Ta1p) and with the capacitance ($C_{B1}$) to thereby define a switched serial combination (312a). The switched serial combination (312a) is coupled between the first tap (At) and a reference potential (RTN). A fifth switch controller (T1as, 314; 414) is coupled to the controllable fifth switch (SWa1; Ta1p), for switching the fifth switch (SWa1; Ta1p) into conduction during those intervals in which the load current is less than a selected value and for switching the controllable fifth switch (SWa1; Ta1p) into a nonconductive state during those intervals in which the load current exceeds the selected value. In a particular embodiment of this aspect of the invention, the first inductance element is an inductor ($L_{cc1}$) and the fifth switch (SWa1; Ta1p) includes a switched current path (SWa1) and at least a conduction control terminal or port (314a; T1as) by which the conduction state of the switched current path can be controlled. As an alternative, or in addition, the inductance may include a component attributable to the second transformer. In a particularly advantageous embodiment of this aspect of the invention, the controllable fifth switch comprises a switch transformer (Ta1) including first (T1ap) and second (T1as) mutually coupled windings, where the first winding (T1ap) of the switch transformer (T1a) is serially coupled with the capacitance ($C_{B1}$) and the first inductance element ($L_{cc1}$), and the second winding (T1as) of the switch transformer (T1a) is coupled to the fifth switch controller (18). In a most preferred embodiment of the invention, the dc-to-dc converter (300; 400; 500) further comprises a controllable sixth switch (SWa2; Ta2p) and a second capacitance (CB2). A second inductance element ($L_{cc2}$) is serially coupled with the controllable sixth switch (SWa2; Ta2p) and with the second capacitance (CB2) to thereby define a second switched serial combination (412b; 512b), which second switched serial combination (412b; 512b) is coupled between the second tap (Bt) and a reference potential (RTN). A sixth switch controller (Ta2s, 414 and FWR$_2$) is coupled to the controllable sixth switch (SWa2; Ta2), for switching the sixth switch (SWa2; Ta2p) into conduction during those intervals in which the load (R$_L$) current is less than a selected value and for switching the controllable sixth switch (SWa2; Ta2p) into a nonconductive state during those intervals in which the load current exceeds the selected value.

A dc-to-dc converter (500) according to another aspect of the invention comprises first (Q1) and second (Q2) controllable switches, each controllable switch including a controllable current path (drain-to-source) and a control input port (gate). The controllable current paths (drain-to-source) of the first (Q1) and second (Q2) controllable switches are connected as a first half-bridge (A) with a first tap (At), a first connection node (13) adjacent the first controllable switch (Q1) and remote from the first tap (At), and a second connection node (15) adjacent the second controllable switch (Q2) and remote from the first tap (At). The first connection node (13) is connected to energizing voltage of a first (+) polarity from a first terminal of a source (12) of direct energizing voltage, and the second connection node (15) is connected to energizing voltage of a second polarity (−) from the source (12) of direct energizing voltage. The dc-to-dc converter further includes third (Q3) and fourth (Q4) controllable switches, each including a controllable current path (drain-to-source) and a control input port (gate). The controllable current paths of the third (Q3) and fourth (Q4) controllable switches are connected as a second half-bridge (B) with a second tap (Bt), a third connection node (17) adjacent the third controllable switch (Q3) and remote from the second tap (Bt), and a fourth connection node (19) adjacent the fourth controllable switch (Q4) and remote from the second tap (Bt). The third connection node (17) is connected to energizing voltage of the first polarity (+) from the first terminal of the source (12) of direct energizing voltage, and the fourth connection node (19) is connected to energizing voltage of the second polarity (−) from the source (12) of direct energizing voltage. A phase-shift pulse-width-modulated controller (18) is coupled to the control input ports of the first (Q1), second (Q2), third (Q3), and fourth (Q4) controllable switches, for switching the first, second, third, and fourth controllable switches so that a fixed-frequency alternating voltage (FIG. 2C) appears between the first (At) and second (Bt) taps of the half-bridges with a duty cycle selected to provide the desired output voltage. The dc-to-dc converter further includes an output transformer (T1) including primary (T1p) and secondary (T1s) windings. The primary winding (T1p) of the output transformer (T1) is coupled to the first (At) and second (Bt) taps, so that the alternating voltage (FIG. 2C) is applied to the primary winding (T1p) of the output transformer (T1). A full-wave rectifier (30) is connected to the secondary winding (T1s) of the output transformer, for rectifying secondary winding (T1s) current flowing under the impetus of the alternating voltage. A filter (35) is coupled to the full-wave rectifier (30) for producing output direct voltage for application to a load (R$_L$). The dc-to-dc converter further comprises an inductance (Lcc1), a capacitor (C$_{B1}$), and a second transformer (Ta1) including first (Ta1p) and second (Ta1s) mutually coupled windings. The first coupled winding (T1ap) of the second transformer (Ta1) is coupled in series with the capacitor (C$_{B1}$) between the first tap (At) and a reference potential (RTN). The inductance (Lcc1) is switchably (414) coupled with the second winding (Ta1s) of the second transformer (Ta1). A controller is coupled to the inductance (Lcc1) and to the second winding (Ta1s) of the second transformer (T1a) in such a manner that during those intervals in which the load (R$_L$) current exceeds a particular value, the second winding (T1as) of the second transformer (T1a) is open-circuited, and such that during those intervals in which the load (R$_L$) current is less than the particular value, the second winding (T1as) of the second transformer (T1a) is coupled in series with the inductance (Lcc1).

In a particular embodiment of this aspect of the invention, the dc-to-dc converter (500) further comprises a second inductance (Lcc2), a second capacitor (C$_{B1}$), and a third transformer (Ta2) including first (Ta2p) and second (Ta2s) mutually coupled windings. The first coupled winding (Ta2p) of said third transformer (Ta2) is coupled in series with the second capacitor (C$_{B2}$) between said first tap (Bt) and a reference potential (RTN). The second inductance (Lcc2) is switchably (414) coupled with the second winding (Ta2s) of the third transformer (Ta2). A second controller (414, FWR$_2$) is coupled to the second inductance (Lcc2) and to said second winding (Ta2s) of the second transformer (Ta2) in such a manner that during those intervals in which the load (R$_L$) current exceeds a particular value, the second winding (T2as) of the second transformer (T2a) is open-circuited, and such that during those intervals in which the load (R$_L$) current is less than the particular value, the second winding (T2as) of the second transformer (T2a) is coupled in series with the second inductance (Lcc2).

What is claimed is:
1. A dc-to-dc converter comprises:
first and second controllable switches, each controllable switch including a controllable current path and a control input port, said controllable current paths of said first and second controllable switches being connected as a first half-bridge with a first tap, a first connection node adjacent said first controllable switch and remote from the first tap, and a second connection node adjacent said second controllable switch and remote from said first tap, said first connection node being connected to energizing voltage of a first polarity from a first terminal of a source of direct energizing voltage, and said second connection node being connected to energizing voltage of a second polarity from said source of direct energizing voltage;
third and fourth controllable switches, each including a controllable current path and a control input port, said controllable current paths of said third and fourth controllable switches being connected as a second half-bridge with a second tap, a third connection node adjacent said third controllable switch and remote from said second tap, and a fourth connection node adjacent said fourth controllable switch and remote from said second tap, said third connection node being connected to energizing voltage of the first polarity from said first terminal of said source of direct energizing voltage, and said fourth connection node being connected to energizing voltage of the second polarity from said source of direct energizing voltage;
a phase-shift pulse-width-modulated controller coupled to said control input port of said first, second, third, and fourth controllable switches, for switching the first, second, third, and fourth controllable switches so that a fixed-frequency alternating voltage appears between said first and second taps of said half-bridges with a duty cycle selected to provide the desired load current;

an output transformer including primary and secondary windings, said primary winding of said output transformer being coupled to said first and second taps, so that said alternating voltage is applied to said primary winding of said output transformer;

a full-wave rectifier connected to the secondary winding of said output transformer, for rectifying secondary winding current flowing under the impetus of said alternating voltage;

a filter coupled to said full-wave rectifier for producing output direct voltage for application to a load;

a controllable fifth switch;

a capacitance;

a first inductance element serially coupled with said controllable fifth switch and with said capacitance to thereby define a switched serial combination, said switched serial combination being coupled between said first tap and a reference potential; and a fifth switch controller coupled to said controllable fifth switch, for switching said fifth switch into conduction during those intervals in which the load current is less than a selected value and for switching said controllable fifth switch into a nonconductive state during those intervals in which the load current exceeds said selected value.

2. A dc-to-dc converter according to claim 1, wherein:
said first inductance element is an inductor; and
said fifth switch includes a switched current path and at least a conduction control terminal by which the conduction state of said switched current path can be controlled.

3. A dc-to-dc converter according to claim 1, wherein said controllable fifth switch comprises a switch transformer including first and second mutually coupled windings, said first winding of said switch transformer being serially coupled with said capacitance and said first inductance element, and said second winding of said switch transformer being coupled to said fifth switch controller.

4. A dc-to-dc converter according to claim 1, further comprising:
a controllable sixth switch;
a second capacitance;
a second inductance element serially coupled with said controllable sixth switch and with said second capacitance to thereby define a second switched serial combination, said second switched serial combination being coupled between said second tap and a reference potential; and
a sixth switch controller coupled to said controllable sixth switch, for switching said sixth switch into conduction during those intervals in which the load current is less than a selected value and for switching said controllable sixth switch into a nonconductive state during those intervals in which the load current exceeds said selected value.

5. A dc-to-dc converter comprising:
first and second controllable switches, each controllable switch including a controllable current path and a control input port, said controllable current paths of said first and second controllable switches being connected as a first half-bridge with a first tap, a first connection node adjacent said first controllable switch and remote from the first tap, and a second connection node adjacent said second controllable switch and remote from said first tap, said first connection node being connected to energizing voltage of a first polarity from a first terminal of a source of direct energizing voltage, and second connection node being connected to energizing voltage of a second polarity from said source of direct energizing voltage;

third and fourth controllable switches, each including a controllable current path and a control input port, said controllable current paths of said third and fourth controllable switches being connected as a second half-bridge with a second tap, a third connection node adjacent said third controllable switch and remote from said second tap, and a fourth connection node adjacent said fourth controllable switch and remote from said second tap, said third connection node being connected to energizing voltage of the first polarity from said first terminal of said source of direct energizing voltage, and said fourth connection node being connected to energizing voltage of the second polarity from said source of direct energizing voltage;

a phase-shift pulse-width-modulated controller coupled to said control input port of said first, second, third, and fourth controllable switches, for switching the first, second, third, and fourth controllable switches so that a fixed-frequency alternating voltage appears between said first and second taps of said half-bridges with a duty cycle selected to provide the desired load current;

an output transformer including primary and secondary windings, said primary winding of said output transformer being coupled to said first and second taps, so that said alternating voltage is applied to said primary winding of said output transformer;

a full-wave rectifier connected to the secondary winding of said output transformer, for rectifying secondary winding current flowing under the impetus of said alternating voltage;

a filter coupled to said full-wave rectifier for producing output direct voltage for application to a load;

an inductance;

a capacitor;

a second transformer including first and second mutually coupled windings, said first coupled winding being coupled in series with said capacitor between said first tap and a reference potential;

said inductance being switchably coupled with said second winding of said second transformer; and a controller coupled to said inductance and to said second winding of said second transformer in such a manner that during those intervals in which said load current exceeds a particular value, said second winding of said second transformer is open-circuited, and such that during those intervals in which said load current is less than said particular value, said second winding of said second transformer is coupled in series with said inductance.

6. A dc-to-dc converter according to claim 5, further comprising:
a second inductance;
a second capacitor;
a third transformer including first and second mutually coupled windings, said first coupled winding of said third transformer being coupled in series with said second capacitor between said first tap and a reference potential;

said second inductance being switchably coupled with said second winding of said third transformer; and a second controller coupled to said second inductance and to said second winding of said second transformer in such a manner that during those intervals in which said load current exceeds a particular value, said second winding of said second transformer is open-circuited, and such that during those intervals in which said load current is less than said particular value, said second winding of said second transformer is coupled in series with said second inductance.

7. A dc-to-dc converter according to claim 5, wherein said second controller further comprising a second rectifier.

* * * * *